United States Patent
Raschilla et al.

[11] Patent Number: 6,153,329
[45] Date of Patent: Nov. 28, 2000

[54] BATTERY TERMINAL COVER

[75] Inventors: Anthony Raschilla, Girard; James Okrucky, Warren, both of Ohio

[73] Assignee: Delphi Technologies Inc., Troy, Mich.

[21] Appl. No.: 09/207,752

[22] Filed: Dec. 8, 1998

[51] Int. Cl.[7] ............................................. H01M 2/00
[52] U.S. Cl. ............................................. 429/65; 439/522
[58] Field of Search ................. 429/65, 170; 174/138 F;
439/519, 521, 522, 754, 756, 765, 766, 745, 892, 147

[56] References Cited

U.S. PATENT DOCUMENTS 1,808,648   6/1931   Fisher .
2,800,522   7/1957   Coleman et al. .
3,568,139   3/1971   Delzer .
4,920,018   4/1990   Turner .
5,503,642   4/1996   Lippert et al. .
5,516,601   5/1996   Caroseli et al. .

*Primary Examiner*—Maria Nuzzolillo
*Assistant Examiner*—Susy Tsang
*Attorney, Agent, or Firm*—Richard A. Jones

[57] ABSTRACT

A battery terminal cover is provided for a battery in an automotive vehicle. The battery terminal cover includes a base portion operatively connected to a terminal lead and a retention portion disposed within the base portion to allow the battery terminal cover to be engaged after the terminal lead is fastened to the terminal of the battery to retain the base portion in a closed position over the terminal.

17 Claims, 1 Drawing Sheet

BATTERY TERMINAL COVER

BACKGROUND OF THE INVENTION

1. Field of the Invention

The present invention relates generally to batteries for vehicles and, more particularly, to a battery cover for a battery in an automotive vehicle.

2. Description of the Related Art

It is known to provide a cover for a terminal of a battery in a vehicle such as an automotive vehicle. Typically, the cover is made of a plastic material such as polypropylene and attached to a housing of the battery by a fastener. The cover is retained in place over the terminal by stacking batteries on top of one another and the weight of the batteries is used to hold the cover in place.

Although the above battery cover works well, it suffers from the disadvantage that it does not have a retention feature to lock the battery cover in a desired location. Another disadvantage of the battery cover is that harness assembly is relatively difficult. As a result, there is a need in the art to provide a battery cover for a terminal of a battery that provides electrical isolation and environmental protection.

SUMMARY OF THE INVENTION

Accordingly, the present invention is a battery cover for a terminal of a battery. The battery cover includes a base portion operatively connected to a terminal lead for connection to the terminal of the battery. The battery cover also includes a retention portion disposed within the battery cover to be engaged after the terminal lead is fastened to the terminal of the battery to retain the base portion in a closed position over the terminal.

One advantage of the present invention is that a battery cover is provided for a terminal of a battery in an automotive vehicle. Another advantage of the present invention is that the battery cover incorporates a retention feature that allows the battery cover to be engaged after a terminal lead is fastened to the terminal of the battery. Yet another advantage of the present invention is that the battery cover incorporates a retention feature to provide electrical isolation and eliminate the ability of the battery cover to be easily removed during manufacturing. Still another advantage of the present invention is that the battery cover provides environmental protection and strain relief. A further advantage of the present invention is that the battery cover is a one-piece low profile system.

Other features and advantages of the present invention will be readily appreciated, as the same becomes better understood after reading the subsequent description taken in conjunction with the accompanying drawings.

DESCRIPTION OF THE PRESENTLY PREFERRED EMBODIMENT

Figure 1:
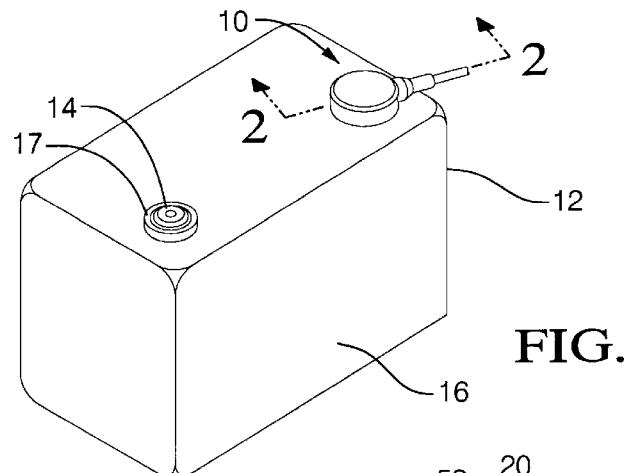
FIG. 1 is a perspective view of a battery cover, according to the present invention, illustrated in operational relationship with a battery.

Referring to the drawings and in particular FIG. 1, one embodiment of a battery cover 10, according to the present invention, is shown for a battery 12 of a vehicle (not shown) such as an automotive vehicle. The battery 12 includes at least one terminal 14 connected to at least one cell (not shown). The battery 12 includes housing 16 encasing or enclosing the cell. The housing 16 has a raised lip 17 surrounding the terminal 14. It should be appreciated that, except for the battery cover 10 and terminal 14 and raised lip 17, the battery 12 is conventional and is known in the art.

Figure 2:
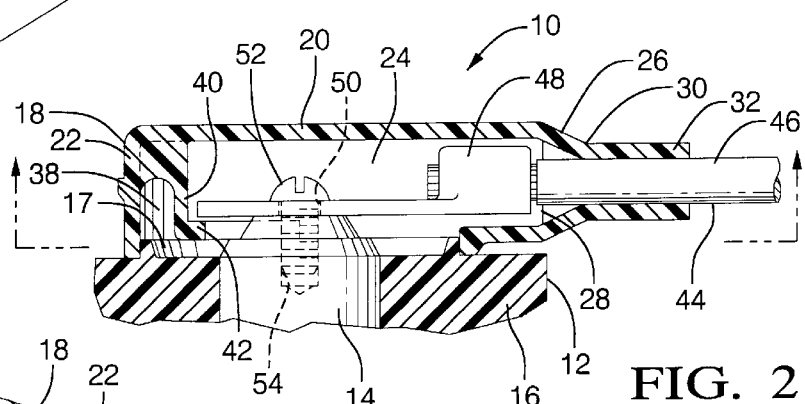
FIG. 2 is a sectional view taken along line 2—2 of FIG. 1.
Figure 3:
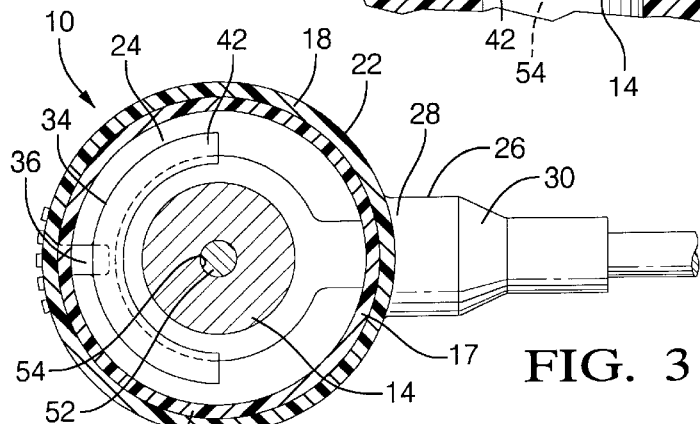
FIG. 3 is a sectional view taken along line 3—3 of FIG. 2.
Figure 4:
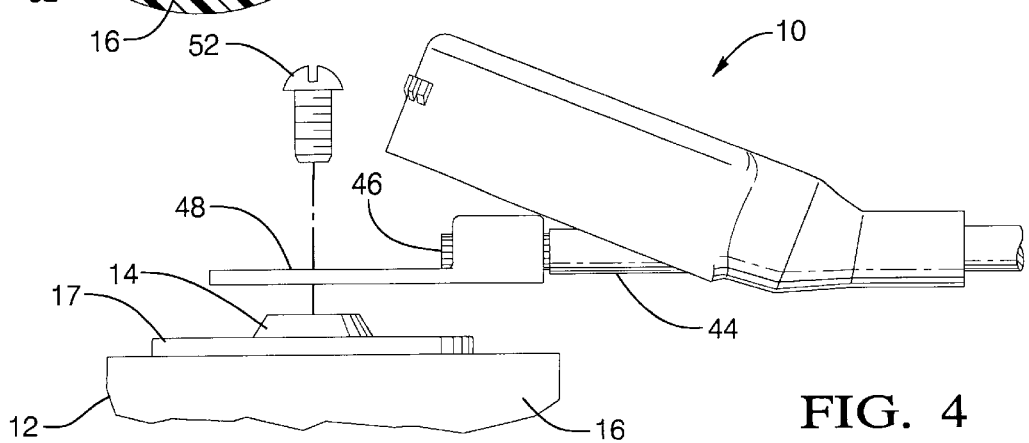
FIG. 4 is an exploded elevation view of the battery cover and battery of FIG. 1.

Referring to FIGS. 2 and 3, the battery cover 10 includes a boot or base portion 18. The base portion 18 has a generally planar top wall 20 with a generally circular shape. The base portion 18 has a side wall 22 extending generally perpendicular from the top wall 20 and disposed circumferentially about the top wall 20 to form a cavity 24 therein. The top wall 20 and side wall 22 are integral, unitary and formed as one-piece.

The battery cover 10 also includes a transition portion 26 extending radially from the side wall 22 of the base portion 18. The transition portion 26 is generally tubular and circular in shape. The transition portion 26 has a first end 28 connected to the base portion 18 and a second end 30 extending radially from the first end 28. The first end 28 has a diameter larger than the second end 30. The transition portion 26 is integral, unitary and formed as one-piece with the base portion 18.

The battery cover 10 also includes a strain relief portion 32 extending axially from the transition portion 26. The strain relief portion 32 is generally tubular and circular in shape. The strain relief portion 32 is integral, unitary and formed as one-piece with the transition portion 26.

The battery cover 10 includes a retention portion 34 disposed within the cavity 24 of the base portion 18. The retention portion 34 has a connecting wall 36 extending from the top wall 20 and the side wall 22 to form a channel 38. The channel 38 has a generally inverted U-shape. The retention portion 34 has a retention wall 40 extending generally perpendicular from the connecting wall 36. The retention wall 40 has a flange 42 extending radially and forming a general C-shape. The battery cover 10 is made of a non-conductive material such as EPDM or the like.

A terminal lead 44 interconnects the battery 12 and an electrical component (not shown) of the automotive vehicle that requires power. The terminal lead 44 has a cable 46 and a ring terminal 48 connected to one end of the cable 46 by suitable means such as sonic welding. The ring terminal 48 is generally planar and circular in shape. The ring terminal 48 includes a central aperture 50 extending there through. The terminal lead 44 is connected to the terminal 14 of the battery 12 by a fastener 52 such as a M5 fastener or the like extending through the aperture 50 in the ring terminal 48 and threadably engaging a threaded aperture 54 in the terminal 14.

In operation, the battery cover 10 has its strain relief portion 32 stretched over the cable 46 of the terminal lead 44 such that there is a tight fit there between, thereby eliminating the need for terminal insulation wings on the terminal 14 which results in a low profile. The strain relief portion 32 provides strain relief for the cable 46 and positive placement on the terminal lead 44. The base portion 18 is placed over the ring terminal 48 of the terminal lead 44 to electrically isolate the ring terminal 48. The terminal lead 44 is fastened to the terminal 14 of the battery 12 by extending the fastener 52 through the aperture 50 in the ring terminal 48 and threadably engaging the threaded aperture 54 in the terminal 14. The top wall 20 of the battery cover 10 is pressed downward causing the retention wall 40 to flex radially outward, extend past the ring terminal 48 and return radially inward. As a result, the flange 42 is disposed and engaged under a front portion of the ring terminal 48. Thus, when the retention portion 34 is engaged, the base portion 18 is retained in a closed position over the terminal 14 and ring terminal 48 to provide environmental protection, electrical isolation and strain relief. It should be appreciated that the raised lip 17 on the battery 12 provides a barrier against water intrusion and maintains the roundness of the battery cover 10.

Accordingly, the battery cover 10 has a retention portion 30 that is easily engaged during final assembly with current assembly equipment. The battery cover 10 provides total electrical isolation, increases environmental protection and eases harness assembly as well as battery pack manufacturing assembly in a low profile connection.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A battery cover for a terminal of a battery comprising:
a base portion operatively connected to a terminal lead for connection to the terminal of the battery;
a transition portion extending radially from said base portion;
a tubular strain relief portion extending axially from said transition portion; and
a retention portion integrally connected to said base portion and disposed within said base portion for engagement with the terminal lead after the terminal lead is fastened to the terminal of the battery to retain said base portion in a closed position over the terminal.

2. A battery cover as set forth in claim 1 wherein said base portion comprises a top wall and a side wall extending generally perpendicular from said top wall to form a cavity therein.

3. A battery cover as set forth in claim 2 wherein said top wall is planar.

4. A battery cover as set forth in claim 2 wherein said top wall is circular in shape.

5. A battery cover for a terminal of a battery comprising:
a base portion operatively connected to a terminal lead for connection to the terminal of the battery;
a retention portion integrally connected to said base portion and disposed within said base portion for engagement with the terminal lead after the terminal lead is fastened to the terminal of the battery to retain said base portion in a closed position over the terminal;
wherein said base portion comprises a top wall and a side wall extending generally perpendicular from said top wall to form a cavity therein; and
wherein said retention portion comprises a connecting wall extending from said base portion and within said cavity.

6. A battery cover as set forth in claim 5 wherein said retention portion comprises a retention wall extending from said connecting wall.

7. A battery cover as set forth in claim 6 wherein said retention portion includes a flange extending perpendicular from said retention wall.

8. A battery cover for a terminal of a battery comprising:
a base portion operatively connected to a terminal lead for connection to the terminal of the battery;
a retention portion integrally connected to said base portion and disposed within said base portion for engagement with the terminal lead after the terminal lead is fastened to the terminal of the battery to retain said base portion in a closed position over the terminal; and
a transition portion extending radially from said base portion, wherein said transition portion is tubular.

9. A battery cover as set forth in claim 8 wherein said transition portion has a first end connected to said base portion and a second end spaced from said first end and having a diameter less than a diameter of said first end.

10. A battery cover for a terminal on a battery comprising:
a base portion operatively connected to a terminal lead for connection to the terminal of the battery;
a retention portion operatively connected to said base portion and having a retention wall and a flange extending perpendicular to said retention wall for extending between the terminal and the terminal lead to retain said base portion in a closed position over the terminal;
wherein said base portion comprises a planar top wall and an annular side wall extending perpendicular from said top wall to form a cavity therein; and
a tubular transition portion extending radially from said base portion.

11. A battery cover as set forth in claim 10 wherein said transition portion has a first end and a second end spaced from said first end and having a diameter less than a diameter of said first end.

12. A battery cover as set forth in claim 10 including a tubular strain relief portion extending axially from said transition portion.

13. A battery cover for a terminal on a battery comprising:
a base portion operatively connected to a terminal lead for connection to the terminal of the battery; and
a retention portion having a connecting wall extending from said base portion, a retention wall extending from said connecting wall, and a flange extending perpendicular to said retention wall for extending between the terminal and the terminal lead to retain said base portion in a closed position over the terminal.

14. A battery cover as set forth in claim 13 wherein said base portion comprises a planar top wall and an annular side wall extending perpendicular from said top wall to form a cavity therein.

15. A battery cover as set forth in claim 13 wherein said battery cover is made of a non-conductive plastic material.

16. A battery comprising:
a housing having a terminal;
a terminal lead for connection to a device requiring power;
a fastener to secure said terminal lead to said terminal; and
a battery cover having a base portion operatively connected to said terminal lead, a transition portion extending radially from said base portion and being tubular, and a retention portion operatively connected to said base portion and disposed between said terminal lead and said terminal to retain said base portion in a closed position over said terminal.

17. A battery as set forth in claim 16 wherein said base portion comprises a top wall and a side wall extending perpendicular from said top wall to form a cavity therein and said retention portion comprises a connecting wall connected to said base wall and a retention wall having a flange disposed beneath said terminal lead.

* * * * *